United States Patent
Fukuyoshi et al.

(10) Patent No.: US 7,403,243 B2
(45) Date of Patent: Jul. 22, 2008

(54) HOUSING AND DISPLAY DEVICE PROVIDED WITH THE HOUSING

(75) Inventors: Hirokazu Fukuyoshi, Kanagawa (JP); Shin-Ichirou Ono, Kanagawa (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 341 days.

(21) Appl. No.: 11/030,962

(22) Filed: Jan. 10, 2005

(65) Prior Publication Data

US 2005/0151895 A1    Jul. 14, 2005

(30) Foreign Application Priority Data

Jan. 9, 2004    (JP)    ............... 2004-004696

(51) Int. Cl.
*G02F 1/1333*    (2006.01)

(52) U.S. Cl. ......................... 349/58; 362/632

(58) Field of Classification Search ............ 349/58, 349/74; 362/632–634; 348/790
See application file for complete search history.

(56) References Cited

U.S. PATENT DOCUMENTS 6,734,927 B2 *    5/2004    Sato ........................... 349/58
6,762,806 B1 *    7/2004    Matsuo et al. ............... 349/58
6,762,807 B2 *    7/2004    Lee et al. ..................... 349/58
7,123,318 B2 *   10/2006    Nagakubo et al. ........... 349/74
2003/0067564 A1 * 4/2003    Sato ............................ 349/58
2004/0008512 A1 * 1/2004    Kim ........................... 362/235

FOREIGN PATENT DOCUMENTS

| JP | H2-91397 | 7/1990 |
| JP | 9-114393 | 5/1997 |
| JP | H9-146466 | 6/1997 |
| JP | 2001-117084 | 4/2001 |
| JP | 2001-290445 | 10/2001 |

* cited by examiner

*Primary Examiner*—Andrew Schechter
*Assistant Examiner*—Nathanael R Briggs
(74) *Attorney, Agent, or Firm*—Young & Thompson

(57) ABSTRACT

A housing for holding and fixing components of a liquid crystal display device is composed of a pair of frame members each having the same shape. Four sides of the side face of each frame member are formed such that an outer face section positioned at the outer side when combined and an inner face section positioned at the inner side when combined are stepped to each other, and a cut section is formed between the outer face section and the inner face section. The side face section of the frame member of the housing is formed to be stepped as described above, so that the strength and assembling property are enhanced, thereby being capable of preventing deterioration in display quality caused by the displacement of the position and space of the components.

16 Claims, 18 Drawing Sheets

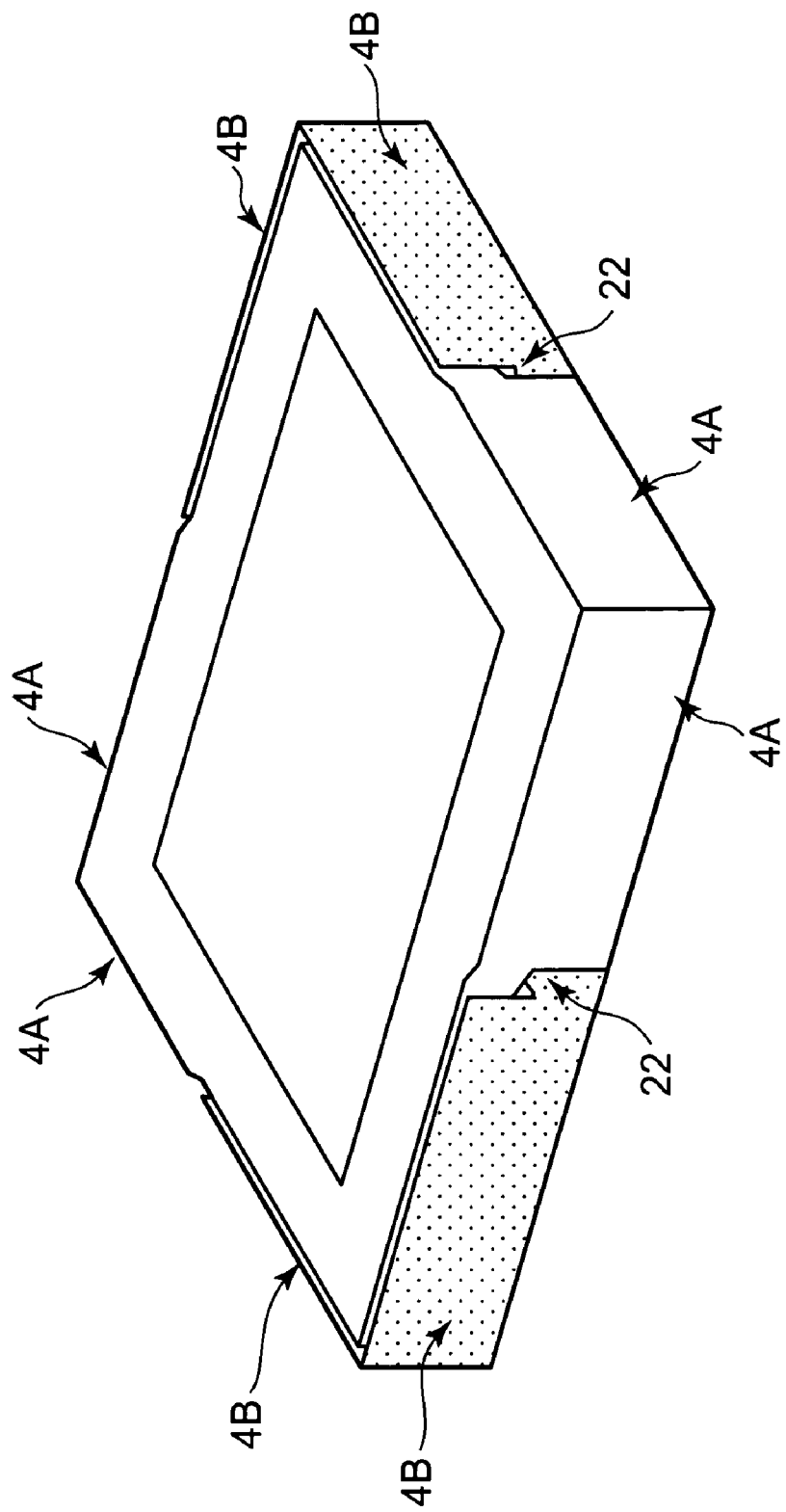

HOUSING AND DISPLAY DEVICE PROVIDED WITH THE HOUSING

BACKGROUND OF THE INVENTION

1. Field of the Invention

The present invention relates to a housing and a display device provided with the housing, and more particularly to a housing that is preferable for use in a display device having display face on both the front and back faces and a double-sided display device provided with the housing.

2. Description of the Prior Arts

A flat-type display device such as a liquid crystal display device or plasma display panel or the like has spread as a display device, wherein its size has been increased. The following explanation is made by taking a liquid crystal display device as one representative example of such a flat-type display device. The liquid crystal display device has widely been used as a monitor for office automation equipment or television because of its feature of being compact, being thin-sized and providing reduced power consumption. The liquid crystal display device is classified into a directly-beneath type (reflection plate type), edge-light type (side-light type) or surface light source type. A directly-beneath type is mainly used for a monitor that requires high brightness. This liquid crystal display device of the directly-beneath type is provided with a liquid crystal panel 6 having liquid crystal sandwiched between opposing transparent substrates, and a substrate 7 connected to the liquid crystal panel 6 via a tape carrier package (TCP) 8 as shown in FIG. 1. The liquid crystal display device is further provided with a backlight device 2 that produces backlight for illuminating the liquid crystal panel 6 and a housing 4 (shield front) for supporting these components.

As shown in FIG. 2, the backlight device 2 is provided with plural bar-like lamps 10 serving as a light source, an inverter substrate 12 or return substrate 13 for supplying power source to the lamps 10 and a return cable 14 (power source circuit section) for connecting these substrates. Moreover, the backlight device 2 is provided with a lamp support frame 11, a reflection plate 15, an optical member comprised of a diffusion plate 18 or optical sheet 19 and a backlight chassis 20 (housing)

Further, a double-sided liquid crystal display device having display face on both the front and back faces has recently been developed. This double-sided liquid crystal display device is provided with a double-sided backlight device 3 for irradiating backlight in both directions of the front face and back face as shown in FIG. 3. A pair of liquid crystal panels 6A and 6B are mounted on each face of this double-sided liquid crystal display device. Substrates 7A and 7B are joined to the liquid crystal panels 6A and 6B via TCP 8A. Housings 4A and 4B (shield front) hold each liquid crystal panel 6A and 6B to the double-sided backlight device 3.

The double-sided backlight device 3 is formed such that its front and back are symmetric so as to be capable of irradiating backlight from both front and back faces; For example, the double-sided backlight device 3 is provided with plural bar-like lamps 10 serving as a light source, an inverter substrate 12 for supplying power source to the lamps 10 and a power source circuit section such as a return cable 14 as shown in FIG. 4. The lamps 10 are nipped to be held by lamp support frames 11A and 11B from both front and back faces. Further, the double-sided backlight device 3 is provided with a reflection plate 17, an optical member comprised of diffusion plates 18A and 18B and optical sheets 19A and 19B, and backlight chassis 20A and 20B (housing of the backlight). The reflection plate 17 reflects light from the lamps 10 toward the liquid crystal panel. An example of the double-sided liquid crystal display device as described above is disclosed in Japanese Published Unexamined Patent Application No. 2001-290445.

A liquid crystal display device has a great number of components as described above. For facilitating the assembling, the liquid crystal panel or backlight device is formed as a unit. These units are supported and fixed en bloc by a housing. When a screen size of the liquid crystal display device is increased, its frame is narrowed and its size is thinned, the width of the frame section of the housing and the width in the thickness direction of the liquid crystal display device are reduced, whereby load applied to the housing is increased. Further, in order to realize reduced cost of the liquid crystal display device, it is required not only to reduce the cost of each unit but also to reduce the cost of the housing itself. Moreover, it also becomes important to facilitate the assembling of the housing and unit, thereby reducing assembling manhour.

In a conventional liquid crystal display device, a general configuration is such that a housing for holding each unit is generally comprised of a frame member having a large size and a frame member having a small size, and this pair of frame members each having a different size are fitted to each other to hold each unit. For example, each unit is held by the combination of the housing 4 and the backlight device 2 in FIG. 1 and the combination of the backlight chassis 20A and the housing 4A and the combination of the backlight chassis 20B and the housing 4B in FIG. 3. The conventional housing structure as described above involves the following problems.

The first problem is that the strength of the entire liquid crystal display device 1 cannot sufficiently be maintained. Specifically, a frame member is generally manufactured by bending a sheet metal, so that the side face of the frame member is formed by a flat plate. Consequently, it is structurally weak with respect to external force, thereby being easy to be deformed. In particular, the width of the frame and the width of the side face are decreased as the screen size is increased and the size of the frame and thickness are decreased, thereby unable to assuredly hold each unit.

Moreover, the second problem is that the housing is difficult to be assembled, so that the deterioration in display quality caused by assembling failure is likely to occur. Specifically, in the structure wherein a great-sized frame member is fitted to a small-sized frame member so as to cover the small-sized frame member, both frame members are prone to tilt during the fitting process, so that the assembling process requires practice. Further, when the frame members are fitted as they are tilted, the position or space of each unit is shifted, resulting in deteriorating display quality. This second problem appears more conspicuously with the increased screen size, narrowed frame and thinned size.

Additionally, the third problem is that, when frame members of plural types each having a different size are combined, frame members of plural types should separately be manufactured, thereby being unable to provide a reduction in cost. Normally, the frame member is manufactured by processing a sheet metal with the use of a mold. In order to prepare frame members of plural types, plural molds should be prepared. Therefore, design cost or processing cost may be increased. Further, in the structure wherein frame members of plural types are combined, these frame members should separately managed, thereby also increasing managing cost.

Moreover, the fourth problem is that, in the structure wherein frame members each having a different size are combined, a difference occurs in the appearance between the front and back, which makes the device bad-looking. From the viewpoint of design, it is important in the double-sided liquid crystal display device that the appearance looks same even seen from the front side or back side.

These problems occurs on not only a liquid crystal display device but also on a display device of any type at least holding a display panel by using a housing.

SUMMARY OF THE INVENTION

The present invention is accomplished in view of the above-mentioned problems, and aims to provide a structure of a housing that can solve the aforesaid problems and a display device provided with the housing, and more particularly to a double-sided display device having a display face on both front face and back face.

In order to achieve the above-mentioned object, the housing of the present invention is a housing for at least holding a display panel, comprising a pair of frame members each having the same shape. Each of the frame members has a structure for fitting to each other when one of the frame members is opposed to the other frame member that is turned over.

Further, the housing of the present invention is a housing for at least holding a display panel, comprising a pair of frame members each having the same shape. Each of the frame members is comprised of a frame member covering the peripheral edge of the display panel and a side face section covering at least a part of the side face of the display panel. A stepped structure comprised of an outer face section positioned at the outer side and an inner face section positioned at the inner side is formed to be symmetric on at least a face of the side face section where a pair of frame members are opposed to each other. A cut section is formed at the aforesaid outer face section and the inner face section of the frame member. One frame member is opposed to the other frame member that is turned over, and the pair of frame members is fitted to each other by the aforesaid cut section.

Further, the housing of the present invention is a housing for at least holding a display panel, comprising a pair of frame members each having the same shape. Each of the frame members is comprised of a frame member covering the peripheral edge of the display panel and a side face section covering four side faces of the display panel. A stepped structure comprised of an outer face section positioned at the outer side and an inner face section positioned at the inner side is formed at each face of four side faces so as to be point-symmetric with respect to the center of the frame section. A cut section is formed at the aforesaid outer face section and the inner face section of the frame member. One frame member is opposed to the other frame member that is turned over, and the pair of frame members is fitted to each other by the aforesaid cut section.

The housing of the present invention can be configured to arrange the outer face sections and the inner face sections such that the outer face sections or inner face sections communicate with each other at the corner section of the adjacent side face sections of the pair of frame members.

Moreover, the housing of the present invention can also be configured such that plural outer face sections or plural inner face-sections are formed on at least the opposing face of the side face section of the pair of frame members.

Further, the housing of the present invention is configured such that formed at one of the opposing outer face section or the inner face section at the side face section of the pair of frame members is a convex section projecting toward the other and formed at the other is a concave section that is engaged with the convex section. Engaging these convex and concave sections with each other can provide a structure for fixing the pair of frame members. The housing of the present invention can also be configured such that formed at one of the opposing outer face section or the inner face section at the side face section of the pair of frame members is a pawl section that is bent toward the other and formed at the other is a slit section into which the pawl section is inserted. Inserting the pawl section into the slit section to establish a latch can also provide a structure for fixing the pair of frame members.

Further, the housing of the present invention can be provided with an outer housing that covers at least a part of the outer face of the pair of frame members. A hole to which a screw can be inserted is formed at the corresponding position of the outer housing and the pair of frame members, and a screw stopper that is threadedly engaged with the screw is formed at the corresponding position of the components held by the pair of frame members. The screw is inserted from the outer side of the outer housing and threadedly engaged with the screw stopper, which can provide a structure for fixing the pair of frame members.

Additionally, the liquid crystal display device of the present invention is provided at least with a liquid crystal panel, backlight device that illuminates the liquid crystal panel, and the above-mentioned housing that holds at least the liquid crystal panel and the backlight device.

Further, the liquid crystal display device of the present invention is provided at least with a double-sided backlight device that illuminates both front and back faces, a pair of liquid crystal panels arranged at each face of the double-sided backlight device, and the above-mentioned housing that holds at least the pair of liquid crystal panels and the backlight device.

As described above, in the housing of the present invention, a stepped structure comprised of the outer face section positioned at the outer side when combined and the inner face section positioned at the inner side when combined is formed on at least a part of the side face section of the pair of frame members so as to be point-symmetric. The cut section is formed at each of the outer face section and inner face section, whereby the frame members having the same shape can be fitted to each other by the cut section. The housing structure of the present invention as described above can enhance the strength compared to the housing in which the side face section is made of a single flat plate. The corresponding outer face section and inner face section upon fitting one of the pair of frame members into the other function respectively as a guide, thereby being capable of maintaining parallelism of both frame members. Therefore, assembling property is enhanced. This can prevent the deterioration in display quality caused by the assembling. Further, each frame member has the same shape, so that manufacturing cost, design cost or managing cost of the housing itself can be reduced. Moreover, the housing of the present invention can have the same shape even seen from either direction of front and back, which can make the device good-looking when it is applied to a double-sided display device.

As explained above, the following advantageous effects can be given according to the housing and the display device provided with the housing of the present invention.

The first advantageous effect of the housing of the present invention is that the strength of the display device can be enhanced.

The reason is that the stepped structure comprised of the outer face section positioned at the outer side when combined and the inner face section positioned at the inner side when combined is formed on at least a part of the side face section of the frame member. Compared to the frame member wherein the side face is made of a single flat plate, this can realize a strong structure with respect to external force such as distortion. A remarkable effect can be obtained in particular in a thin-sized liquid crystal display device having a screen increased in size and a frame that is narrowed.

The second advantageous effect of the housing of the present invention is that the assembling property can be enhanced to thereby be capable of preventing the deterioration in display quality caused by the assembling failure.

The reason is that the corresponding outer face section and inner face section function respectively as a guide upon fitting the pair of frame members to each other, thereby being capable of maintaining parallelism of both frame members. This can prevent that both frame members are fitted as they are tilted to cause local stress. Further, this eliminates the displacement of the position or space of the components held inside.

The third advantageous effect of the present invention is that cost can be reduced.

The reason is that the frame members of the same shape can be combined to thereby reduce manufacturing cost or design cost of the frame member itself or managing cost of the frame member. Further, a single mold is enough for processing the frame member.

The fourth advantageous effect of the present invention is that a good-looking double-sided liquid crystal display device can be manufactured.

The reason is that the double-sided display device is manufactured by combining frame members having entirely same shape, which can make the device have the same shape even seen from either direction of front and back.

BRIEF DESCRIPTION OF THE DRAWINGS

The above and other objects, features and advantages of the present invention will become more apparent from the following detailed description when taken in conjunction with the accompanying drawings wherein:

FIG. 6 is a perspective view showing an appearance of the double-sided liquid crystal display device according to one embodiment of the present invention;

DETAILED DESCRIPTION OF THE PREFERRED EMBODIMENTS

The present invention is accomplished, in its preferable embodiment, based upon a concept that a housing for holding and fixing components of a display device is formed such that a pair of frame members having the same shape are fitted to each other. In the housing structure of the present invention, an outer face section positioned at the outer side when at least a part of the side faces, preferably, four sides of each frame members are combined and an inner face section positioned at the inner side are formed to be stepped, and a cut section having a depth generally a half of the width of the side face is formed between the outer face section and the inner face section. The stepped structure formed at the side face of the housing that is to be fitted can enhance the strength compared to a single flat plate structure. Further, the opposing outer face section and inner face section of the side face of the pair of frame members respectively function as a guide to each other, thereby being capable of remarkably enhancing assembling property of the housing. Therefore, deterioration in display quality of the liquid crystal display device caused by the displacement of the position or space of the internal unit can be prevented. Moreover, the stepped structure and cut section are formed at the side face of the frame members so as to be point-symmetric with respect to the center of the frame, in order to fit one of the frame members that is turned over to the other frame member. This can reduce manufacturing cost, design cost and managing cost of the frame members, and further, the housing is made to have the same shape even seen from either direction of front and back, which can provide a good-looking double-sided display device.

[Embodiments]

Figure 5:
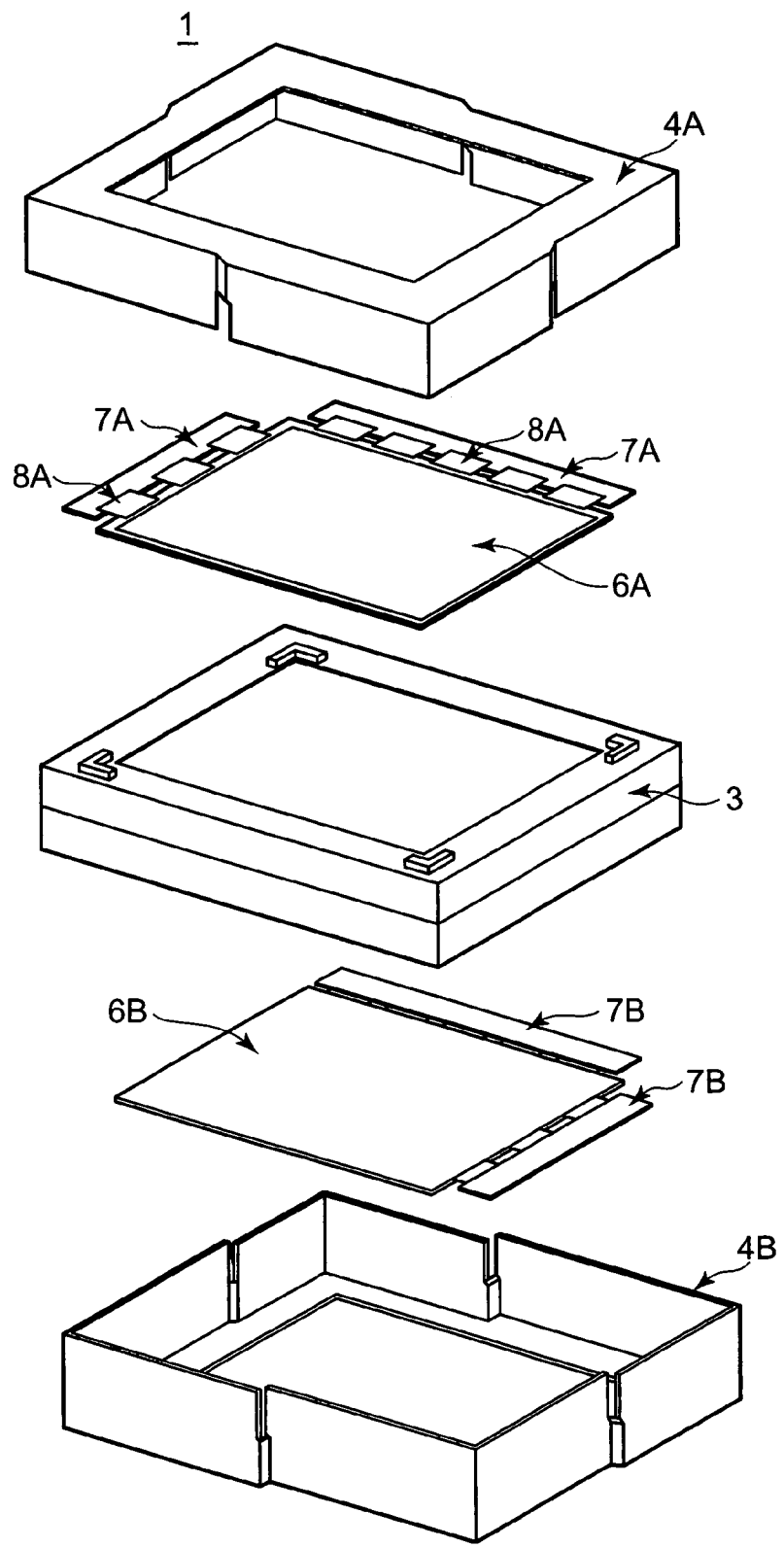
FIG. 5 is an assembling view in which a double-sided liquid crystal display device according to one embodiment of the present invention is disassembled into each component.
Figure 7B:
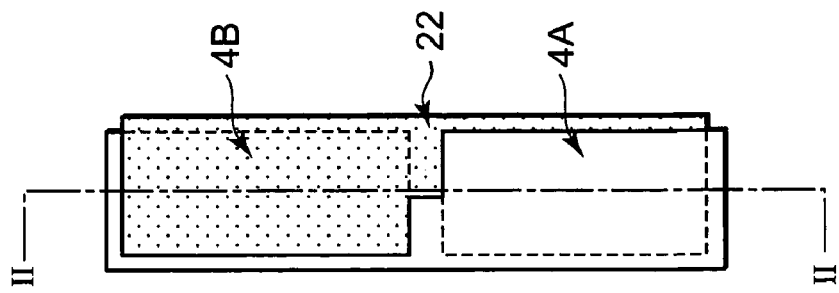
FIG. 7A and FIG. 7B are respectively top view and side view showing a structure of a housing shown in FIG. 6.
Figure 7A:
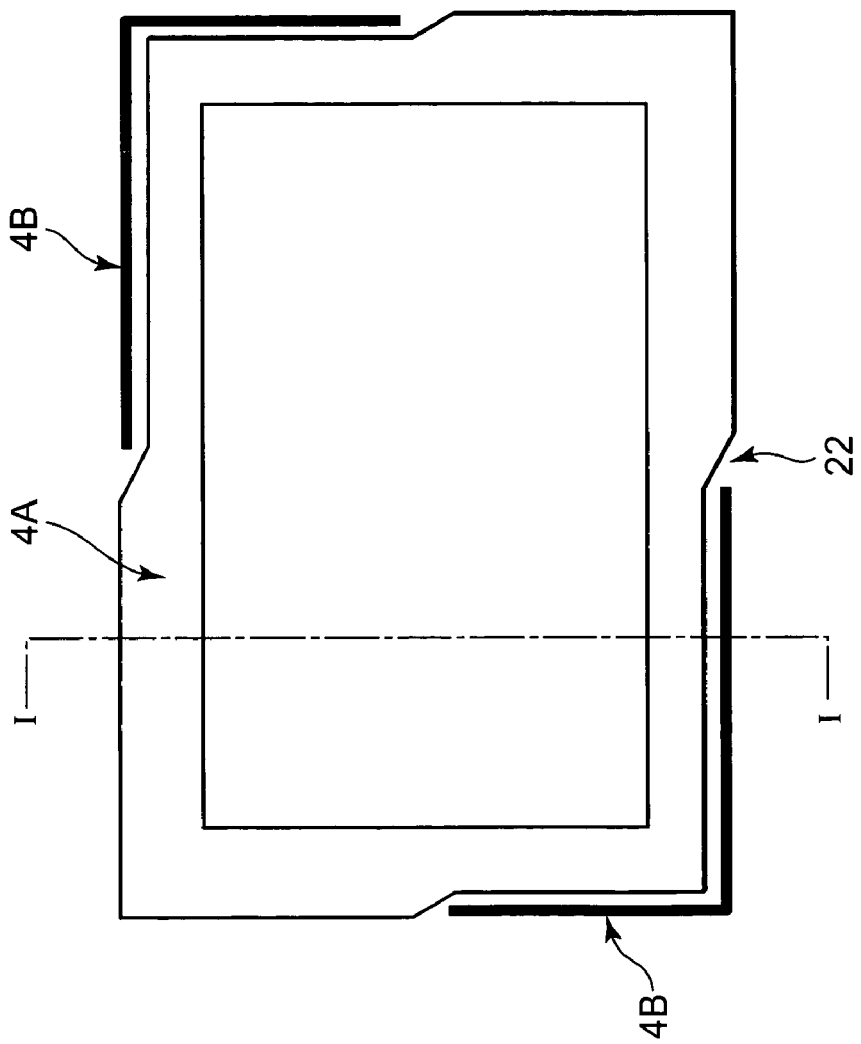
Figure 8:
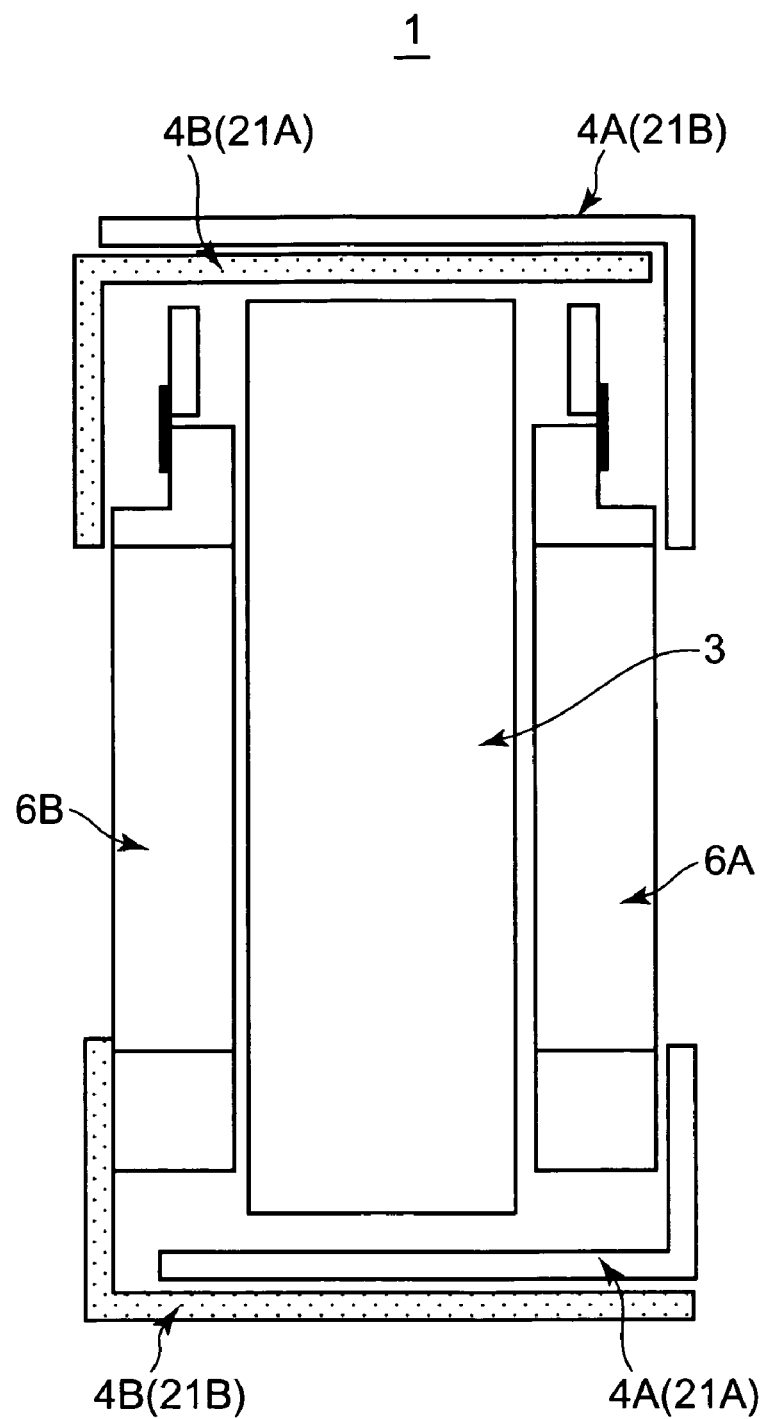
FIG. 8 is a sectional view showing a structure of the housing according to one embodiment of the present invention, and showing that the section of II-II in FIG. 7 is seen from the left side.
Figure 9:
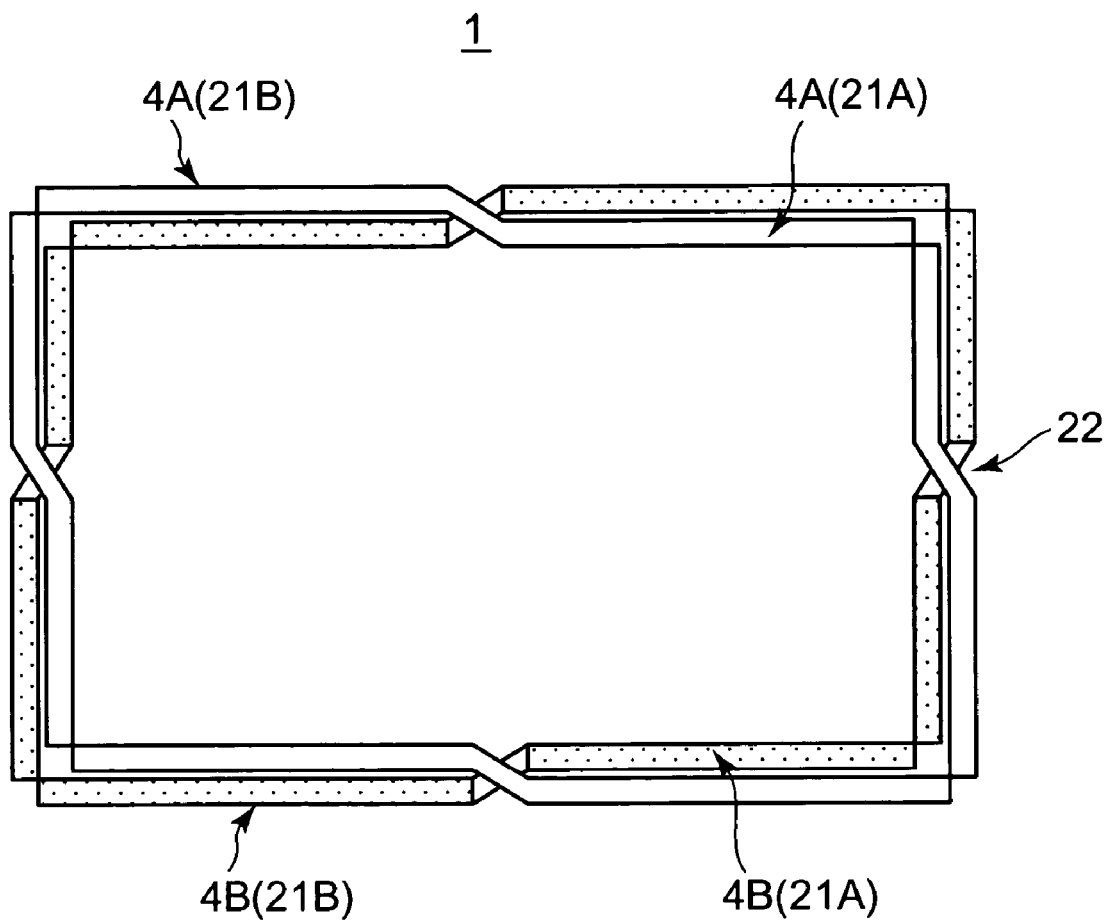
FIG. 9 is a sectional view showing a structure of the housing according to one embodiment of the present invention, and showing that the section of II-II in FIG. 7 is seen from the top.

A housing structure and a double-sided liquid crystal display device provided with the housing according to one embodiment of the present invention will be explained with reference to FIGS. 5 to 17 in order to explain one embodiment of the present invention in more detail. FIG. 5 is an assembly drawing in which a double-sided liquid crystal display device is disassembled into each component, FIG. 6 is a perspective view showing a state wherein the housing according to the present invention is fitted, FIGS. 7A and 7B respectively show a top view and a right side view of FIG. 6, and FIG. 8 and FIG. 9 are sectional views. Further, FIGS. 10 to 17 are views showing a variation of the housing structure of the present invention. It should be noted that the present invention has a feature in the housing structure, so that a structure and shape of other components such as a liquid crystal display or backlight device held and fixed by the housing are not limited.

As shown in FIG. 5, a double-sided liquid crystal display device 1 of the present invention has, as its main components, a double-sided backlight device 3 that irradiates backlight in both directions of the front side and back side, liquid crystal panels 6A and 6B mounted on each face of the double-sided backlight device 3, and housings 4A and 4B that hold each liquid crystal panel 6A and 6B to the double-sided backlight device 3. Moreover, each of the housings 4A and 4B is comprised of a frame section that covers the outer edge of the display face of each liquid crystal panel 6A and 6B and a side face that covers the side face of the liquid crystal display device 1. Each side of the side face section is formed such that the outer face section and the inner face section are stepped to be uneven. A cut section having a depth of substantially a half of the width of each housing 4A and 4B is formed at the center of each side.

Fitting the housings 4A and 4B to each other provides the state shown in FIG. 6. FIG. 7A and FIG. 7B respectively are top view and right side view of the liquid crystal display device 1. One housing 4A and the other housing 4B are combined at cut sections 22, whereby the outer face section of one housing and the inner face section of the other housing make one pair to be fitted to each other. It should be noted that the material or forming method of the housing (frame member) is not particularly limited. It may be formed by pressing an aluminum plate that is conventionally general housing material, or may be formed by injection molding of plastics.

FIGS. 8 and 9 show in more detail a state in which the housings 4A and 4B are fitted to each other. FIG. 8 is a view of I-I section in FIG. 7A seen from the left of the figure, while FIG. 9 is a view of II-II section in FIG. 7B seen from the top of the figure. As shown in FIG. 9, the housing 4A is fitted in such a manner that the outer face section 21B is arranged at the upper left side and the lower right side and the inner face section 21A is arranged at the upper right side and the lower left side. On the other hand, the housing 4B having the shape of the housing 4A turned upside down is fitted in such a manner that the outer face section 21B is arranged at the upper right side and the lower left side and the inner face section 21A is arranged at the upper left side and the lower right side. Combining the housings 4A and 4B at the cut sections 22 forms a side face section of double structure with a pair of the outer face section 21B and the inner face section 21A.

Figure 10:
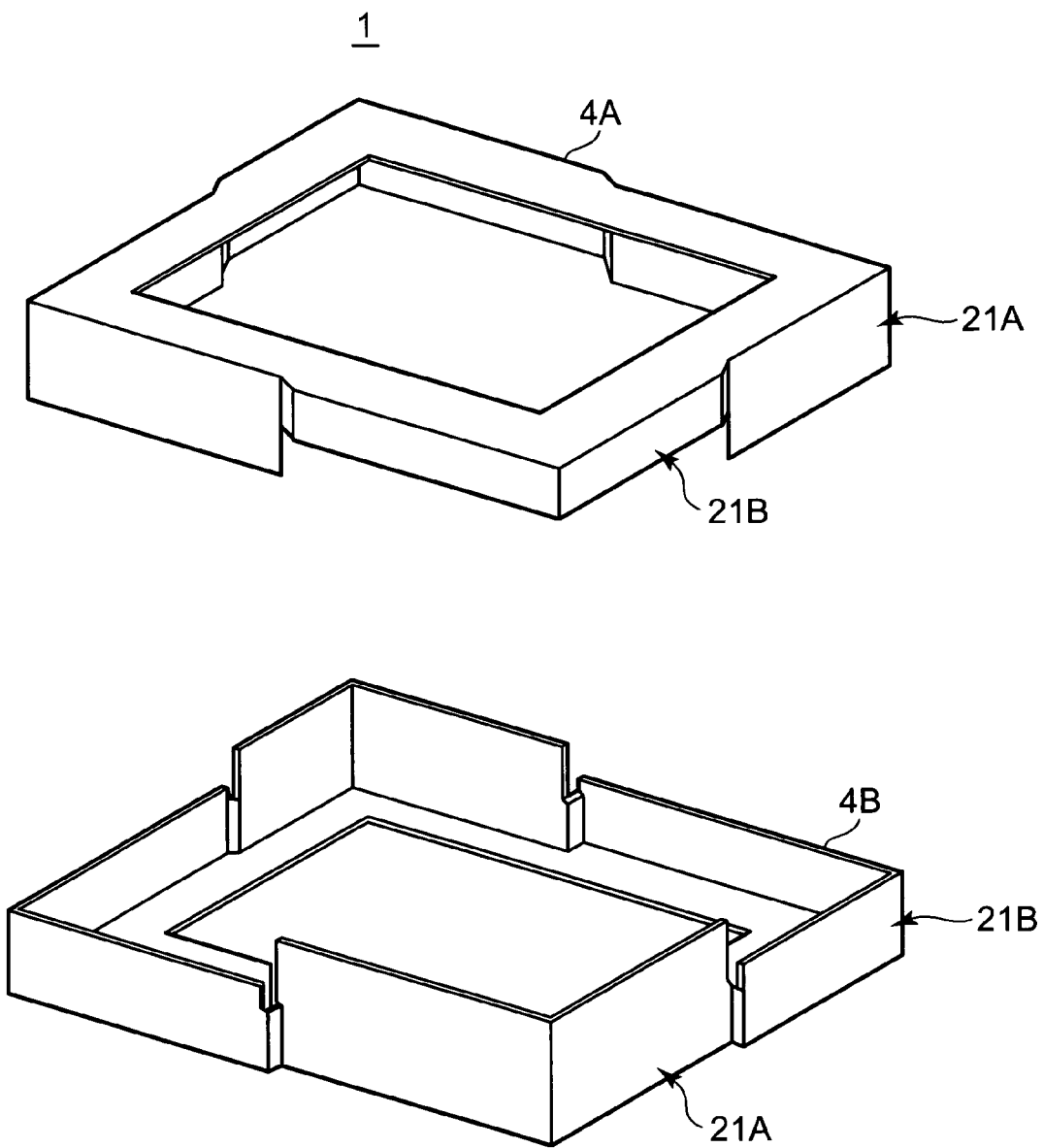
FIG. 10 is a perspective view showing a variation of the housing structure according to one embodiment of the present invention.

As shown in FIG. 9, the inner face section 21A and the outer face section 21B of the opposing sides of each housing 4A and 4B are arranged so as to be point-symmetric with respect to the center of the housing. This is because the outer face section 21B (or the inner face section 21A) of one housing and the inner face section 21A (or the outer face section 21B) of the other housing 4 are opposed to each other even if the other housing is turned over about its major side or about its short side. Further, although the inner face section 21A and the outer face section 21B are formed to have the same size in FIGS. 5 to 9, the width of the inner face section 21A or the outer face section 21B in the thickness direction of the liquid crystal display device 1 may be changed. For example, the width of the outer face section 21B in the thickness direction can be made small, while the width of the inner face section 21A in the thickness direction can be made large as shown in FIG. 10.

Figure 11:
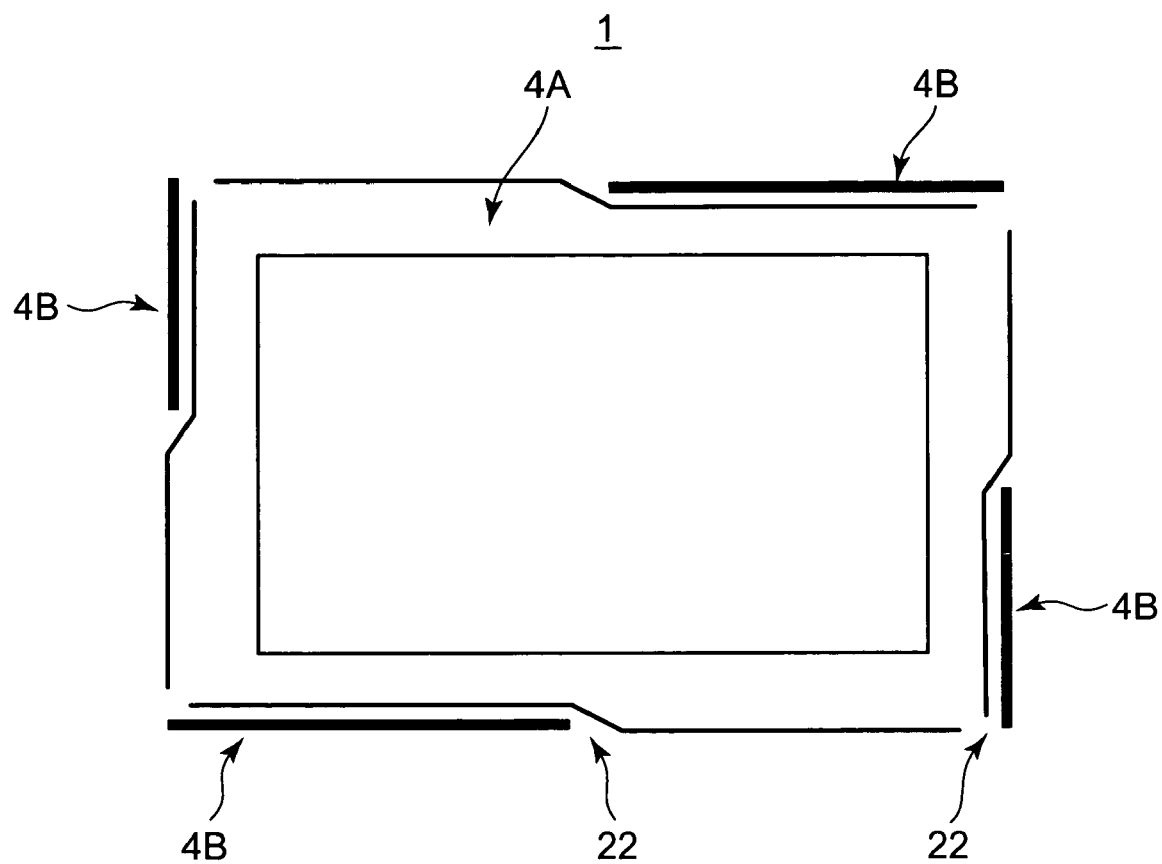
FIG. 11 is a top view showing a variation of the housing structure according to one embodiment of the present invention.

Further, although the outer face sections 21B or inner face sections 21A are positioned at the corner of each housing in FIGS. 5 to 10, the outer face section 21B and the inner face section 21A are arranged so as to be adjacent to each other at the corner of each housing as shown in FIG. 11. Specifically, the outer face section 21B and the inner face section 21A may be alternately arranged over circumference. In this case, a cut section is required to be formed at each corner in order that each housing 4A and 4B are not interfered with each other upon fitting a pair of housings 4A and 4B.

Moreover, the step between the outer face section 21B and the inner face section 21A can be set by considering the thickness of the material of the housing or the degree of fitting. The step between the outer face section 21B and the inner face section 21A are generally set to be equal to or greater than the thickness of the material, but in a case where a pair of housings 4A and 4B are intended to be firmly fixed together, the step may be decreased. Further, the joint section of the outer face section 21B and the inner face section 21A is sloped in order that they do not interfere with each other upon fitting a pair of housings to each other in FIGS. 5 to 11, wherein its slope angle can optionally be set.

Further, although the depth of the cut section 22 is set to be generally a half of the width of the side face section of the housing in the thickness direction in FIGS. 5 to 11, the depth of the cut section 22 can suitably be set by considering the degree of the overlap of the housings 4A and 4B. For example, the depth of the cut can be set to be not more than a half of the width in the thickness direction of the side-face of the housing in order to prevent load from being applied to the inner components. Further, the depth of the cut can be set to be not less than a half of the width in the thickness direction of the side face of the housing in order to perfectly overlap the housings 4A and 4B with each other.

One example of the housings 4A and 4B of this embodiment was shown above. There are other methods considered for realizing the structure in which housings 4A and 4B having the same shape are fitted to each other. Variations of the housing structure according to this embodiment will be explained hereinbelow.

Figure 12:
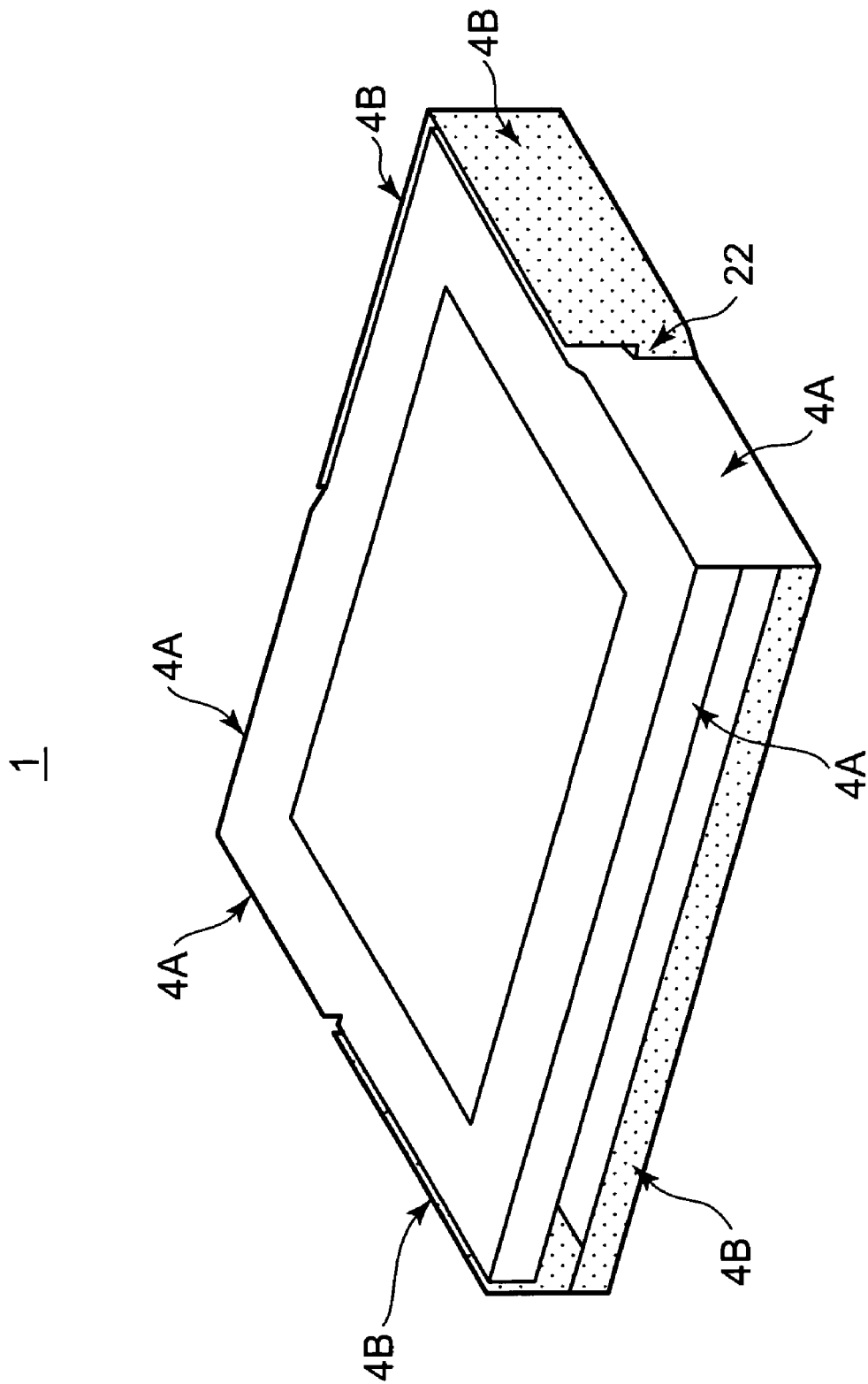
FIG. 12 is a perspective view showing a variation of the housing structure according to one embodiment of the present invention.
Figure 13B:
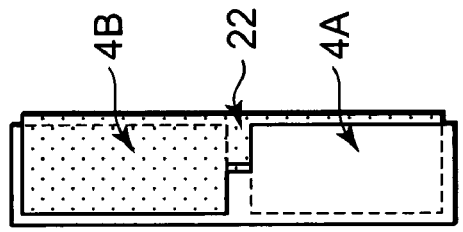
FIG. 13A to FIG. 13C are respectively top view, side view and front view of the housing shown in FIG. 12.
Figure 13A:
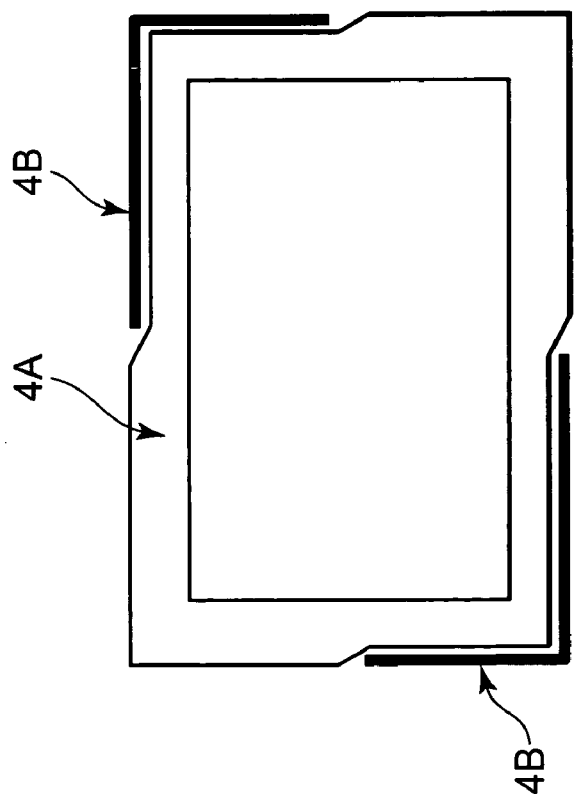
Figure 13C:
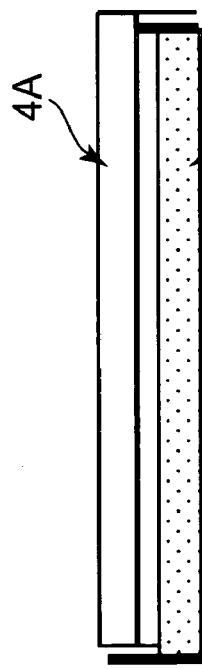

Four sides of the side face section of the housings 4A and 4B have the stepped structure. However, structures shown in FIGS. 12 and 13 are possible when the strength of the liquid crystal display device 1 is sufficiently maintained even though the housings are not fitted by four sides, or when an opening is required to be formed for drawing out a wiring to the outside for driving the liquid crystal panels 6A and 6B or backlight device 3. FIGS. 13A to 13C respectively are top view, right side view and front view of the liquid crystal display device 1. As shown in FIGS. 12 and 13, the outer face section 21B and the inner face section 21A are formed at optional three sides (short sides in the left and right directions and the rearward long side in the figure here). The remaining side (frontward long side in the figure here) is configured such that the width of the side face section is set to be not more than a half of the thickness of the liquid crystal display device 1 in order that each housing does not overlap with each other. In this structure, the housings 4A and 4B are not fitted to each other when the other housing is turned over about the longer side, but the housings 4A and 4B can be fitted to each other when the other housing is turned over about the short side.

Figure 14:
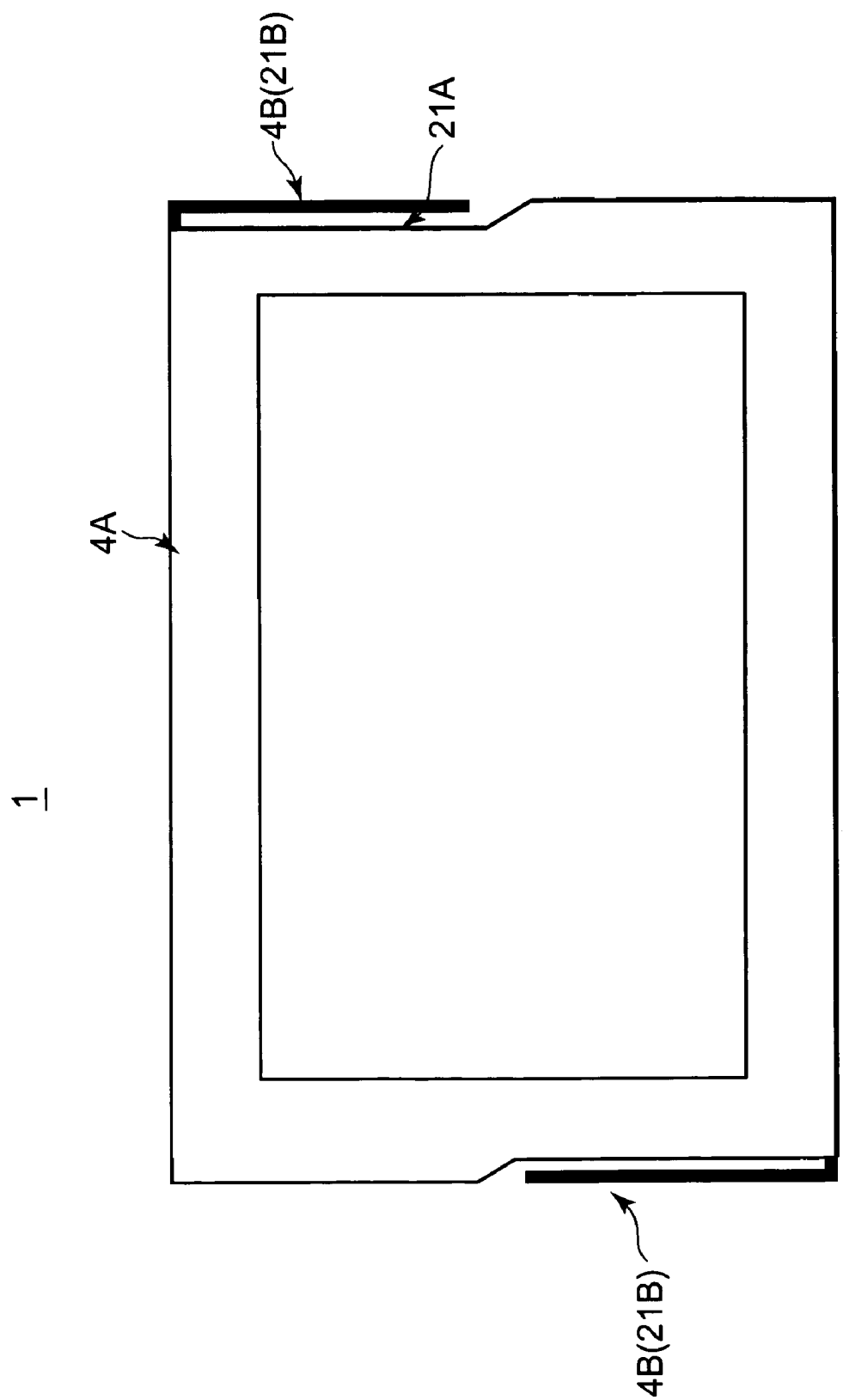
FIG. 14 is a top view showing a variation of the housing structure according to one embodiment of the present invention.

Similarly as shown in FIG. 14, the outer face section 21B and the inner face section 21A are formed on a pair of opposing sides (short sides in the right and left directions in the figure here). The remaining sides (long sides in the vertical direction in the figure here) are configured such that the width of the side face section is set to be not more than a half of the thickness of the liquid crystal display device 1 in order that each housing 4A and 4B does not overlap with each other. In this structure, each housing can be fitted to each other even by any turn-over manner if the outer face section 21B and the inner face section 21A are formed so as to be point-symmetric with respect to the center of housing as shown in the figure. Even in a case where the outer face section 21B and the inner face section 21A are formed so as to be line-symmetric with respect to the short side, the housings can be fitted to each other by turning over the other housing about the long side. For example, turning the other housing over about the long side can make each housing fitted to each other when the inner face section 21A is formed at the upper side of the right and left short sides and the outer face section 21B is formed at the lower side thereof.

Figure 15:
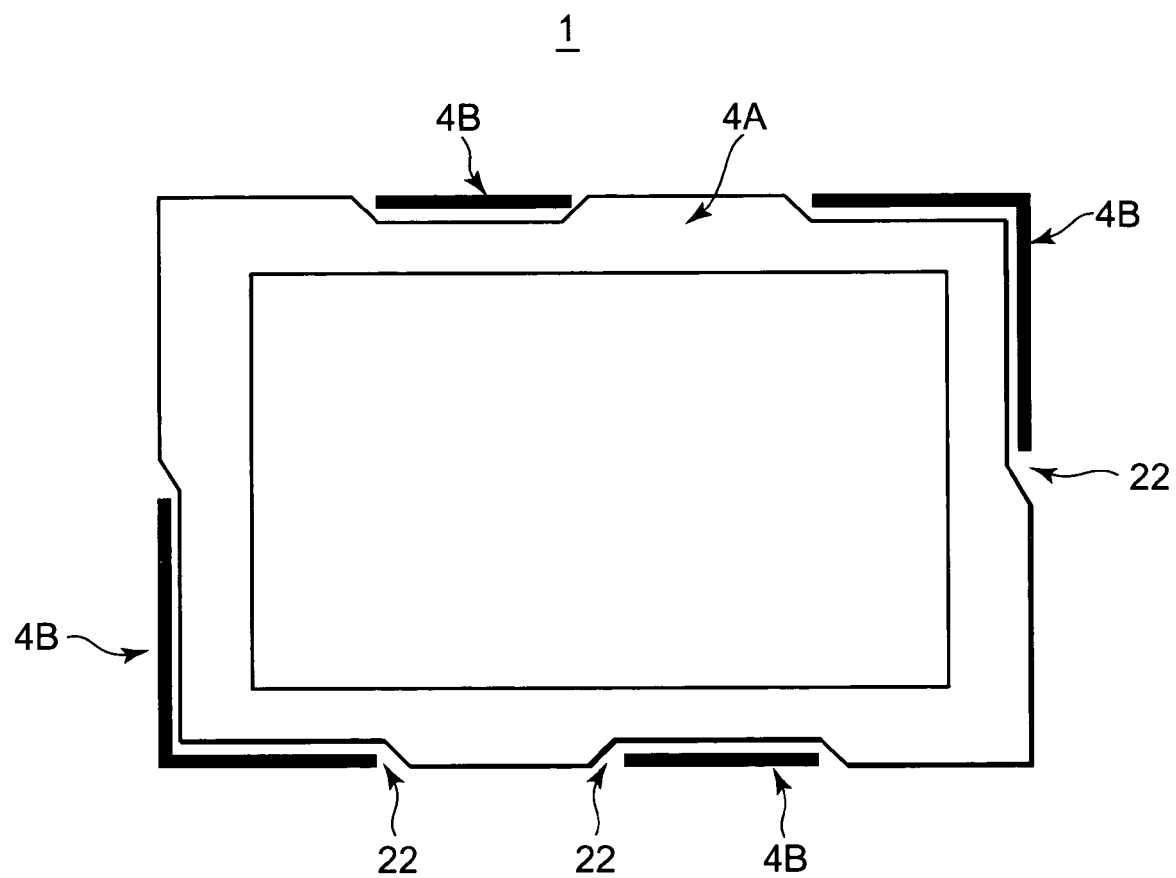
FIG. 15 is a top view showing a variation of the housing structure according to one embodiment of the present invention.

Moreover, although one pair of the outer face section 21B and the inner face section 21A is formed at each side in FIGS. 5 to 14, the number of the outer face section 21B and the inner face section 21A formed on each side is optional. For example, three or more outer face sections 21B and inner face sections 21A can be formed at each side. Further, the number of the outer face section 21B and the inner face section 21A of the short side may be different from that of the long side. For example, as shown in FIG. 15, the number of the outer face section 21B and the inner face section 21A at the longer side is increased to reinforce the longer side section, which is structurally weak, thereby providing uniform strength of the housing.

Figure 16:
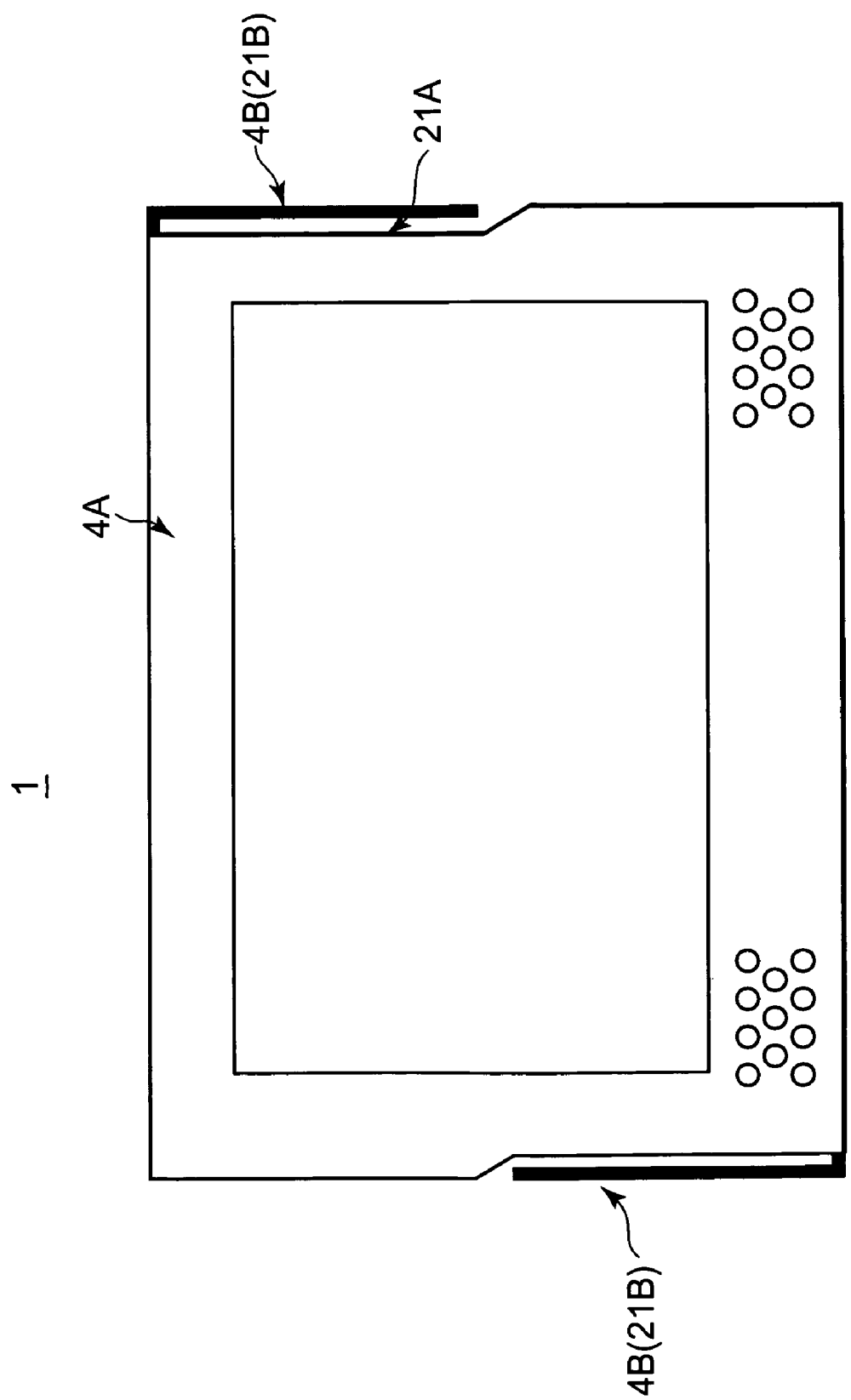
FIG. 16 is a top view showing a variation of the housing structure according to one embodiment of the present invention.

Further, although the width of the frame section of the housing is made equal in FIGS. 5 to 15, the width of the frame section in the direction of the short side (or in the direction of the long side), for example, may be changed when operating means such as a button or a speaker is required to be arranged. In a case where the width of the frame section has a non-symmetric shape, the turn-over direction is limited. For example, in a case where the outer face sections 21B and the inner face sections 21A are formed on the short sides having the same width as shown in FIG. 16, it is necessary to form the outer face sections 21B and the inner face sections 21A so as to be point-symmetric with respect to the center of the housing, in order that the outer face section 21B and the inner face section 21A are combined when the housing is turned over about the short-side direction.

Figure 1:
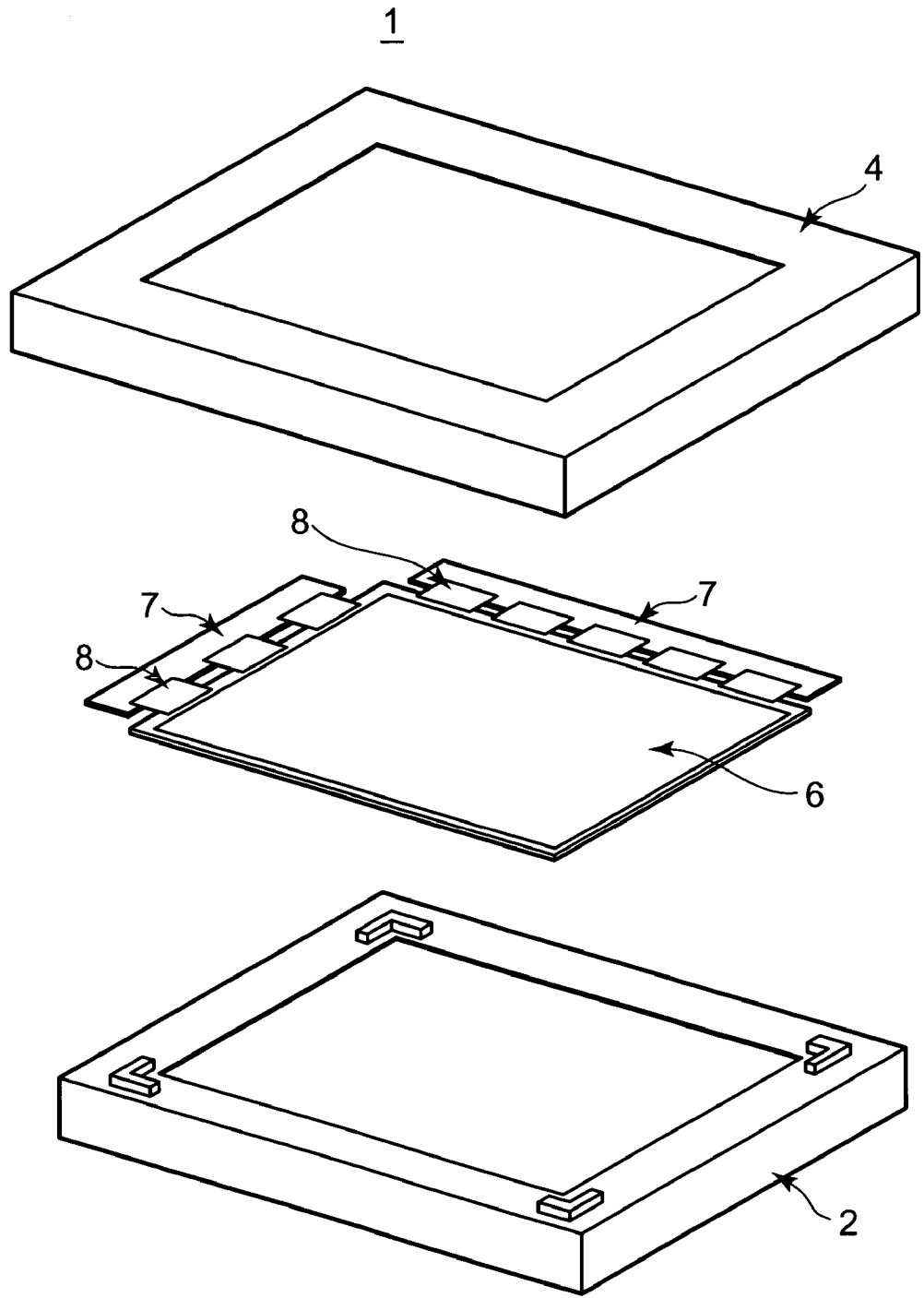
FIG. 1 is an assembling view in which a conventional liquid crystal display device is disassembled into each component.
Figure 2:
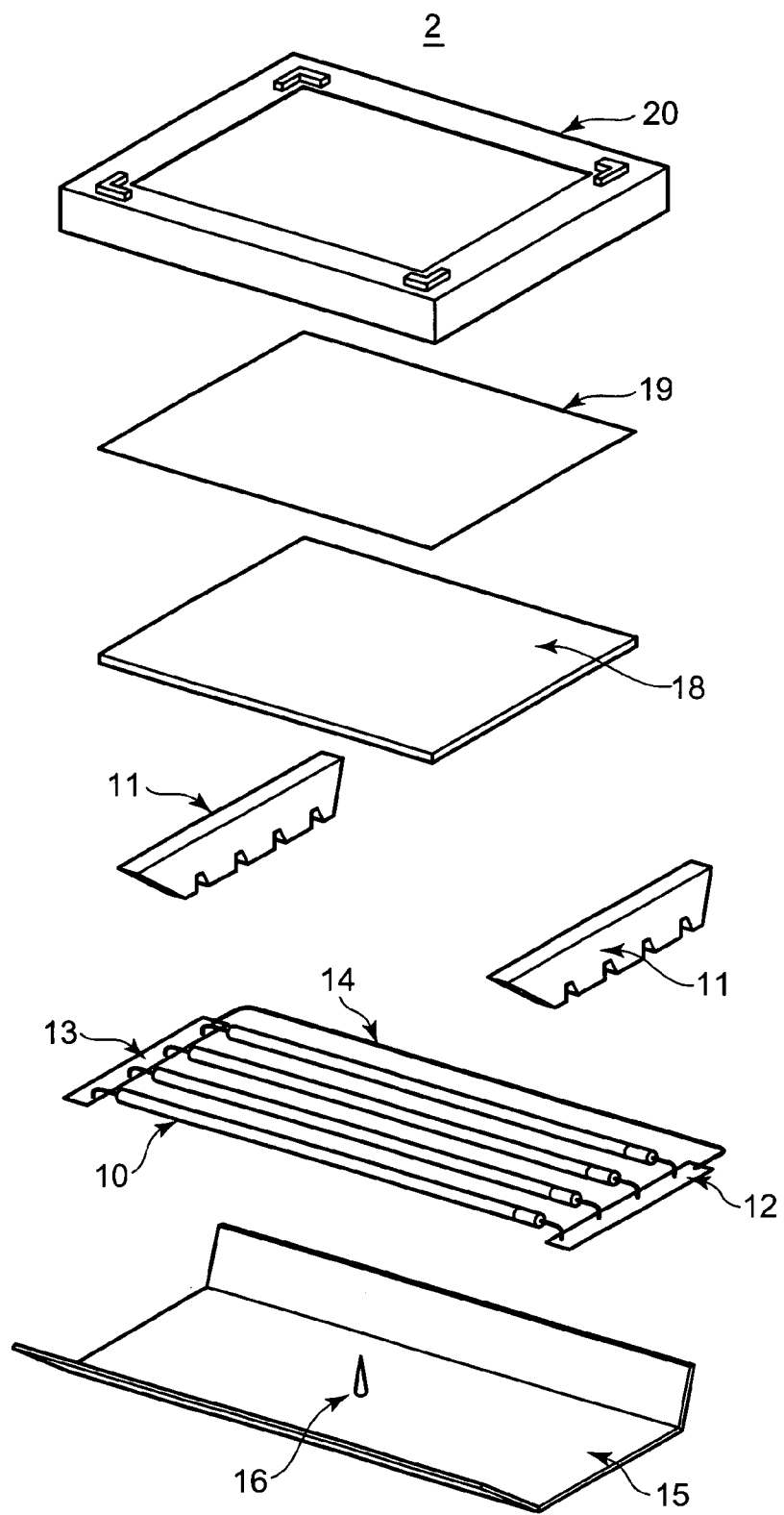
FIG. 2 is an assembling view in which a conventional backlight device is disassembled into each component.
Figure 3:
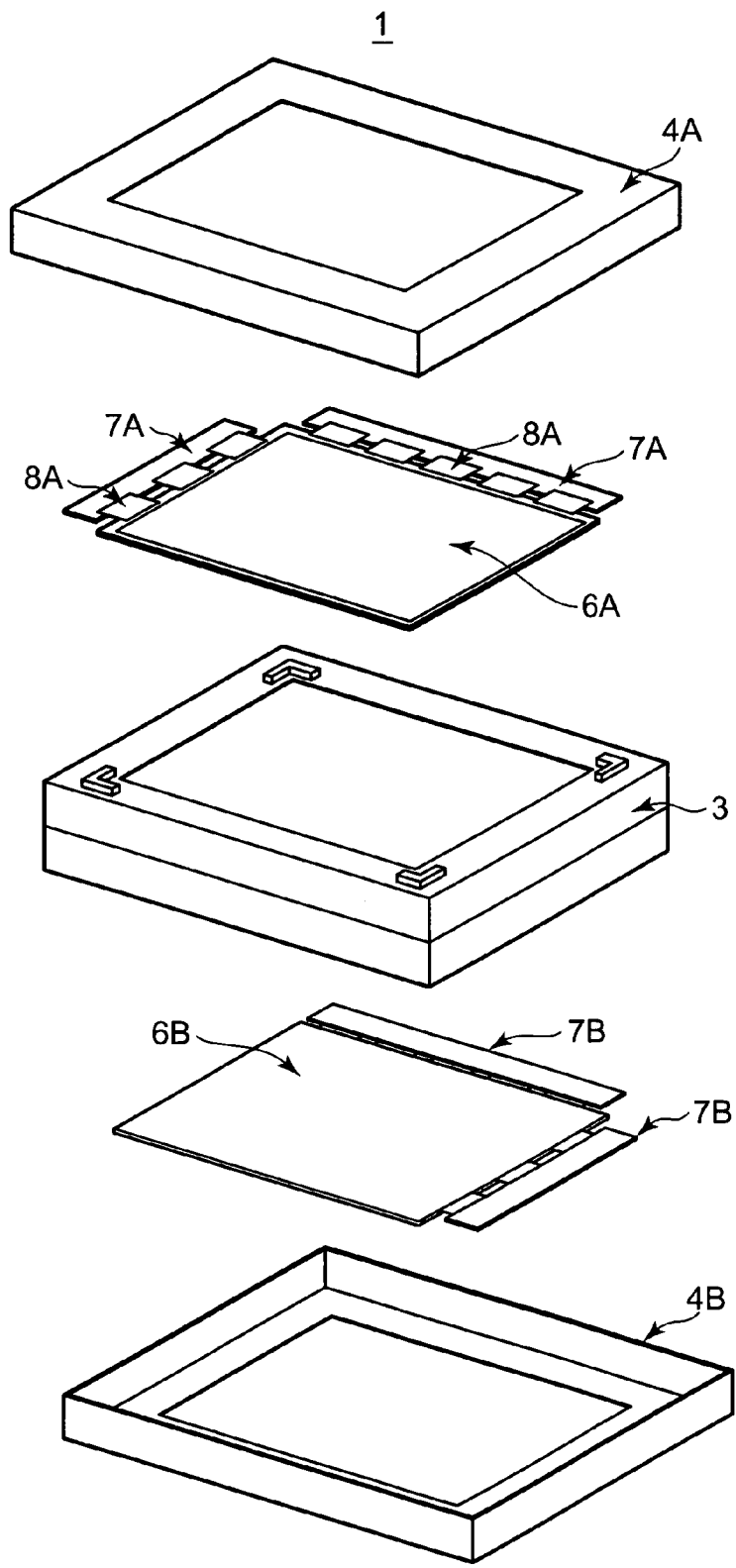
FIG. 3 is an assembling view in which a conventional double-sided liquid crystal display device is disassembled into each component.
Figure 4:
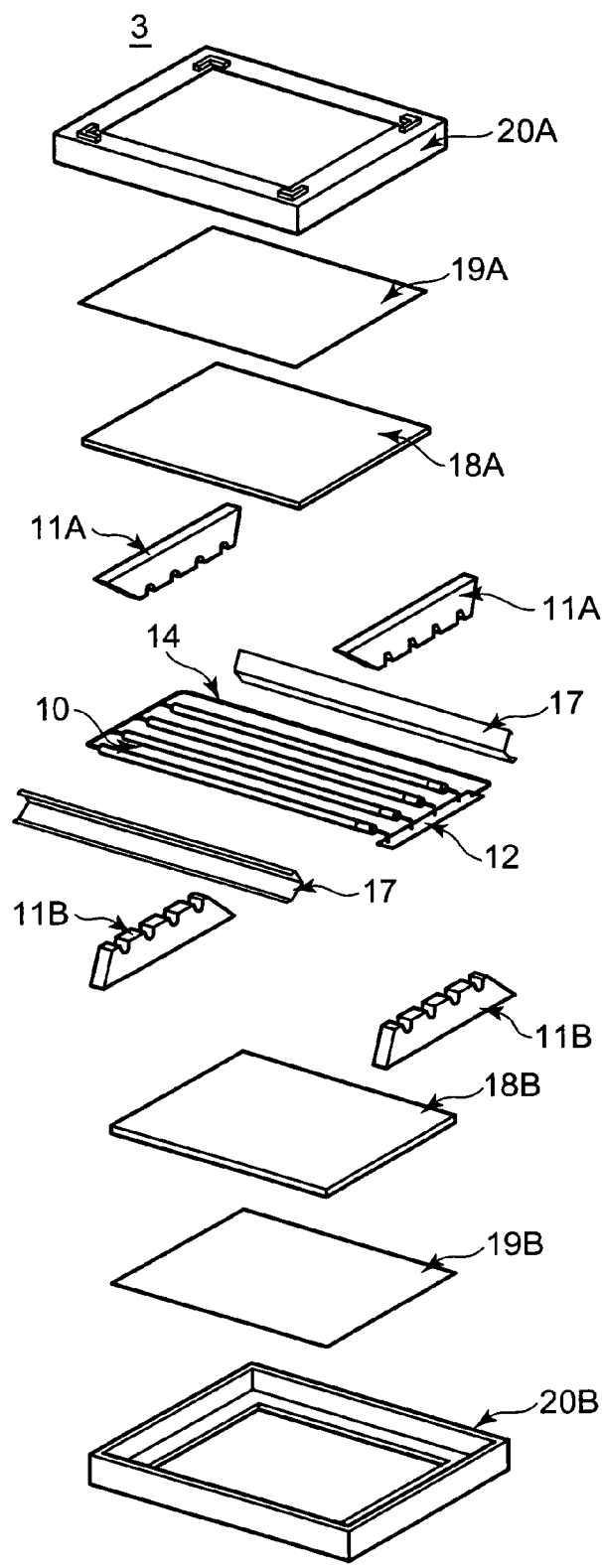
FIG. 4 is an assembling view in which a conventional backlight device is disassembled into each component.
Figure 17A:
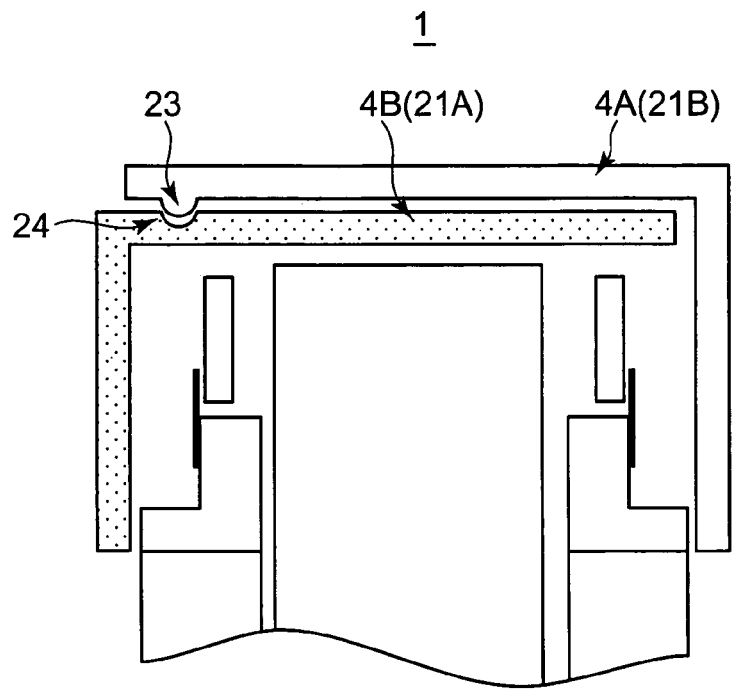
FIG. 17A and FIG. 17B are sections views showing a fixing structure of the housing according to one embodiment of the present invention.
Figure 17B:
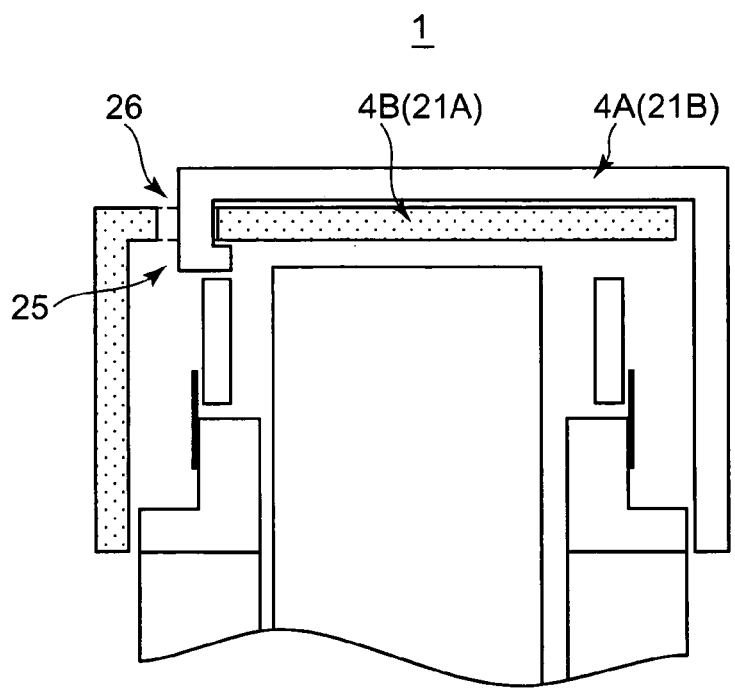

FIGS. 5 to 16 do not show a structure for fixing the housings 4A and 4B fitted to each other. FIG. 17A shows a structure for fixing the housings 4A and 4B fitted to each other. As shown in FIG. 17A, a convex section 23 is formed on one (the outer face section 21B in the figure) of the corresponding outer face section 21B and the inner face section 21A, and a concave section 24 is formed at the other (the inner face section 21A in the figure), whereby the convex section 23 and the concave section 24 are engaged with each other, thereby being capable of fixing the housings 4A and 4B. When such a fixing structure is applied to the conventional housing (housing comprised of a great-sized frame member and a small-sized frame member) shown in FIG. 3, each housing is pressed toward only one of the inner side or the outer side, so that a pair of housings cannot firmly be fixed only by the aforesaid structure. In the structure of the present invention, the inner face section 21A of each housing is pressed toward the inner side and the outer face section 21B of each housing is pressed toward the outer side, with the result that a pair of housings 4A and 4B can firmly be fixed only by the engagement of the convex section and concave section. Further, a fixing structure shown in FIG. 17B is also possible wherein a bending pawl section 25 is provided at the leading end of the corresponding outer face section 21B and a slit section 26 having a size that the pawl section 25 can be inserted is provided at the inner face section 21A. In FIG. 17B, the pawl section 25 is inserted into the slit section 26 to be latched, whereby the housings 4A and 4B can be more firmly fixed. It should be noted that the fixing structure is not limited to those shown in FIGS. 17A and 17B. Further, the shape, forming position, formed number of the convex section 23, the concave section 24, the pawl section 25, and the slit section 26 can suitably be set by considering the strength desired for the housing, arrangement of the components held in the housing, and presence of a gap. For example, the above-mentioned fixing structure may be formed on all outer face sections 21B and inner face sections 21A, or may be formed on only an optional pair of outer face section 21B and inner face section 21A. Further, plural sets of fixing structures may be formed on each outer face section 21B and inner face section 21A, or the housings maybe fixed by the combination of the convex/concave structure and latch structure.

Figure 18:
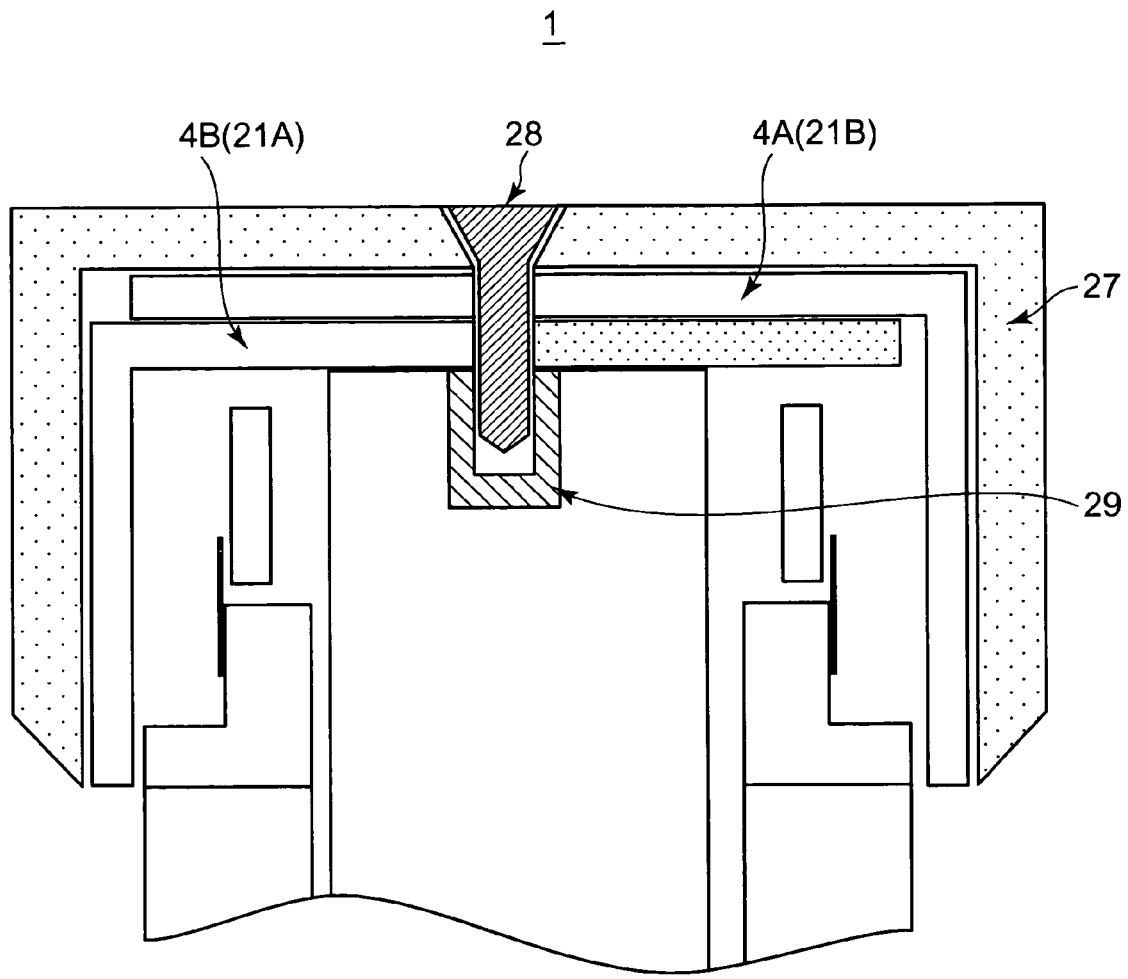
FIG. 18 is a sectional view showing a fixing structure of the housing according to one embodiment of the present invention.

Although FIG. 17 shows the case where the housings 4A and 4B are fixed by using the convex/concave structure or latch structure, the housings 4A and 4B can be fixed by using still another structure. As shown in FIG. 18, for example, a cylindrical outer housing 27 (outer frame member) is covered on the outer side of the housings 4A and 4B, wherein the outer housing 27, housing 4A and housing 4B can be fixed by a screw. In FIG. 18, a hole having a shape into which the housing anchor screw 28 can be inserted is formed on the outer housing 27, housing 4A and housing 4B, and a screw stopper section 29 that is threadedly engaged with the housing anchor screw 28 is formed at the inner component (the double-sided backlight device 3 here). The housing anchor screw 28 is inserted from the outer side of the outer housing 27 and screwed to the screw stopper section 29, thereby fixing the outer housing 27, housing 4A, housing 4B and inner component en bloc. This structure can further enhance the strength of the whole liquid crystal display device 1. It should be noted that the shape, arrangement, number, screw structure or the like of the outer housing 27, housing anchor screw 28 and screw stopper section 29 is not limited to the structure shown in the figure. These housings may be fixed at one face of the liquid crystal display device, may be fixed at plural faces, or may be fixed by plural screws at one face. Moreover, a fixing structure is also possible wherein a threaded hole that is threadedly engaged with the housing anchor screw 28 is formed on the inner face section 21A of the housing 4A or the housing 4B for fixing only the outer housing 27, housing 4A and housing 4B.

As described above in the present invention, the stepped structure composed of the outer face section 21B and the inner face section 21A is formed on at least a part of the side face section of the housings 4A and 4B, and the cut section 22 is formed between the outer face section 21B and the inner face section 21A. Both housings are arranged such that inner face section 21A (or outer face section 21B) of one housing and the outer face section 21B (or inner face section 21A) of the other housing are combined, when one of the housings is turned over to be opposite to the other housing. Therefore, the internal unit can be held by the combination of the housings having the same shape. The stepped structure is formed on the side face section, thereby being capable of enhancing the strength compared to the housing in which the side face section is made of a single flat plate. Each of the outer face section 21B and the inner face section 21A functions as a guide for each other, whereby both housings can simply be assembled with the parallelism of both housings maintained. The housing structure of the present invention can prevent the deterioration in display quality caused by the displacement of the position or space of the components. Further, both housings have the same shape, thereby being capable of reducing cost. Moreover, the appearance looks same even seen from either direction of the front or back, which can make the device good-looking.

In the above explanation, the liquid crystal display device 1 has a rectangle shape and the housings 4A and 4B are made to have a rectangle shape having a side face composed of four sides. However, the shape of each of the housings 4A and 4B can be changed according to the shape of the liquid crystal display device 1. For example, each of the housings 4A and 4B may have a shape having rounded corner sections, a polygon whose corner sections are cut off, or an ellipse. Also in this case, the outer face section and the inner face section can be arranged at the opposing position of the side face section of each housing so as to be point-symmetric with respect to a center of the housing.

The above-mentioned each embodiment shows the case wherein the housing having the structure according to the present invention is applied to a directly-beneath type double-sided liquid crystal display device. However, the present invention is not limited to the aforesaid embodiments. The invention can similarly be applied to another irradiating method of backlight such as an edge-light type or surface light source type or to a liquid crystal display device having a display face on only one face. Further, the structure of the invention can be applied not only to the liquid crystal display device but also to a housing in general for a display device that sandwiches and holds a display panel arranged inside. It is needless to say that a display panel here includes not only a liquid crystal display panel but also a flat-type display panel for a so-called wall-mounted television, such as a plasma display panel, organic EL panel, field emission display (FED) device or the like.

While this invention has been described in connection with certain preferred embodiments, it is to be understood that the subject matter encompassed by way of this invention is not to be limited to those specific embodiments. On the contrary, it is intended for the subject matter of the invention to include all alternative, modification and equivalents as can be included within the spirit and scope of the following claims.

What is claimed is:

1. A housing for a display device for at least holding a display panel, comprising a pair of first frame members, each of said first frame members having a same shape and consisting of a frame section that covers an outer edge of said display panel face and a side face section that covers a side face of said display panel, wherein each of said first frame members has a cut section of a slit shape formed at said side face section thereof that fits to each other when one of said first frame members is turned over and opposed to other said first frame member, wherein said side face sections of said first frame member at both sides of said cut section are formed so as to be stepped.

2. The housing for a display device according to claim 1, further comprising a second frame member that can cover at least a part of an outer face of the pair of said first frame members with the pair of said first frame members fitted to each other.

3. The housing for a display device according to claim 1, wherein said side face sections of said first frame member at both sides of said cut section is formed so as to be stepped.

4. The housing for a display device according to claim 1, wherein said cut section is formed at said side face section except for corner sections of adjacent sides of said first frame members.

5. The housing for a display device according to claim 1, wherein said side face sections of said first frame member at both sides of said cut section is formed to be stepped, and each of said side face sections that is formed to be stepped is formed to be point-symmetric with respect to a center of said first frame members.

6. The housing for a display device according to claim 1, wherein said cut section is formed at said side face section except for corner sections of adjacent sides of said first frame members and at said side face section at corner sections of said adjacent sides of said first frame members.

7. The housing for a display device according to claim 1, wherein a convex section is formed at said side face section of one of the pair of said first frame members and a concave section is formed at said the side face section of other said first frame member, said convex section and said concave section being fitted to each other when one of said first frame members is turned over and opposed to other said first frame member.

8. The housing for a display device according to claim 1, wherein a bending pawl section is formed at said side face section of one of the pair of said first frame members and a slit section into which said bending pawl section is inserted for latching said bending pawl section to other said first frame member is formed at said side face section of other said first frame members.

9. A liquid crystal display device comprising:
a liquid crystal display panel;
a backlight device for illuminating said liquid crystal display panel; and
a housing for holding said liquid crystal display panel and said backlight device,
wherein said housing has a pair of frame members, each of said frame members having a same shape and consisting of a frame section that covers an outer edge of said liquid crystal display panel face and a side face section that covers a side face of said liquid crystal display panel, wherein each of said first frame members has a cut section formed at said side face section thereof, and each of said frame members has a cut section of a slit shape formed at a side face section thereof that fits to each other when one of said frame members is turned over and opposed to other said frame member, and
wherein said housing holds said liquid crystal display panel and said backlight device by fitting said cut section of the pair of said frame members to each other.

10. The liquid crystal display device according to claim 9, wherein said backlight device is a double-sided backlight device and said liquid crystal display panel is provided at a front and back of said backlight device.

11. The liquid crystal display device according to claim 9, wherein a convex section is formed at said side face section of one of the pair of said frame members and a concave section is formed at said side face section of other said frame member, said convex section and said concave section being fitted to each other.

12. The liquid crystal display device according to claim 9, wherein a bending pawl section is formed at said side face section of one of the pair of said frame members and a slit section into which said bending pawl section is inserted for latching said bending pawl section to other said frame member is formed at said side face section of other said frame members.

13. The liquid crystal display device according to claim 9, wherein said side face sections of said frame member at both sides of said cut section is formed to be stepped.

14. The liquid crystal display device according to claim 9, wherein said cut section is formed at said side face section except for corner sections of adjacent sides of said frame members.

15. The liquid crystal display device according to claim 9, wherein said side face sections of said frame member at both sides of said cut section are formed to be stepped, and each of said side face sections that is formed to be stepped is formed to be point-symmetric with respect to a center of said frame members.

16. The liquid crystal display device according to claim 9, wherein said cut section is formed at said side face section except for corner sections of adjacent sides of the frame members and is formed at said side face section at said corner sections of said adjacent sides of said frame members.

* * * * *